C. EMSHEIMER.
INDICATOR.
APPLICATION FILED SEPT. 24, 1909.
970,200.
Patented Sept. 13, 1910.
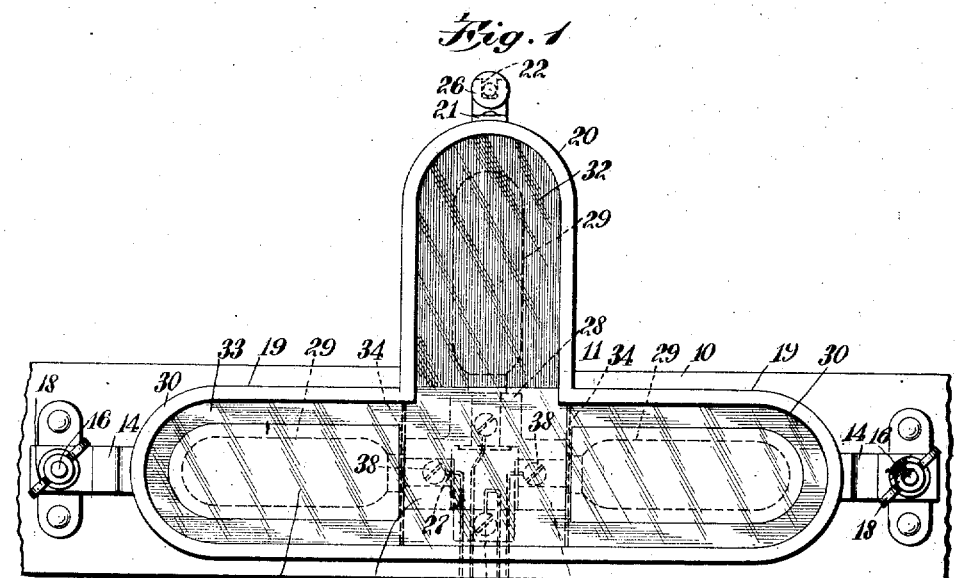
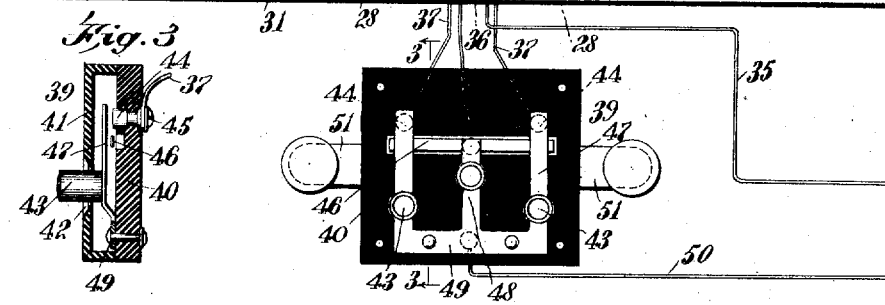
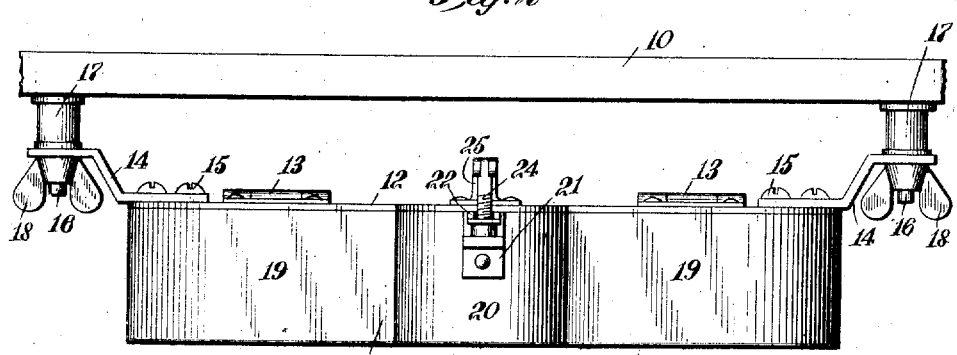
WITNESSES
INVENTOR
Charles Emsheimer
BY
ATTORNEYS

UNITED STATES PATENT OFFICE.

CHARLES EMSHEIMER, OF NEW YORK, N. Y.

INDICATOR.

970,200.  Specification of Letters Patent.  Patented Sept. 13, 1910.

Application filed September 24, 1909. Serial No. 519,305.

*To all whom it may concern:*

Be it known that I, CHARLES EMSHEIMER, a citizen of the United States, and a resident of the city of New York, borough of Manhattan, in the county and State of New York, have invented a new and Improved Indicator, of which the following is a full, clear, and exact description.

This invention relates to indicators for use upon automobiles, other vehicles, and the like, and relates more particularly to an indicator comprising a plurality of separate signals each having a special significance, and means for operating the signals singly and in groups.

The object of the invention is to provide a simple, inexpensive and efficient indicator, by means of which a number of different signals can be given, which can be easily mounted in place upon an automobile or the like, and which is easy of manipulation.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a rear elevation of an embodiment of my indicator showing the signal-controlling means associated therewith; Fig. 2 is a plan view of the indicator; Fig. 3 is a transverse section on the line 3—3 of Fig. 1; and Fig. 4 is a side elevation of the upper part of the indicator, showing a detail.

Before proceeding to a more detailed explanation of my invention, it should be clearly understood that while the indicator can be advantageously employed in different ways for transmitting information through the operation of signal lights or the like, it is particularly useful in connection with vehicles, such as automobiles, fire apparatus and the like, where it serves to give warning to following vehicles, of the change in the course, etc., of the vehicle bearing the indicator. Needless to say, the advantages incident to the use of an indicator of this kind are particularly great in city traffic, or wherever large numbers of vehicles are crowded together. It is often impossible to bring a following vehicle to a halt with such rapidity as to avoid running into a preceding vehicle if the latter is through some emergency brought to a sudden stop, or slows down in order to turn in one direction or the other.

While my indicator is shown as presenting three signals, respectively, designating "Stop," *i. e.*, that the vehicle is to be brought to a halt, "Right," *i. e.*, that the vehicle is about to turn to the right, and "Left," *i. e.*, that the vehicle is about to turn to the left, other signals having other meanings, can of course be also employed, and I do not wish to limit myself to this or other details of construction. It will be understood that these details form no part of the invention, and can be varied in accordance with individual preference and special conditions, without departing from the underlying spirit of my invention.

Referring more particularly to the drawings, I have shown for example, a support 10, consists of a part of a vehicle chassis or the like. I employ a signal casing 11, preferably of inverted T-form and fashioned from sheet metal or the like. The casing has associated therewith a back 12 movably secured thereto by means of hinges 13. The back has at the extremities, offset carriers 14 mounted in position by means of screws 15 or the like, and serving to secure the indicator in place, being mounted on threaded stems 16, and seating upon collars 17 of the stems. Butterfly nuts 18 serve to lock the carriers in position. The casing has two alined parts 19 and at right angles thereto an outwardly extending part 20. The latter has a rigid lug 21 provided with a slot or recess 22 adapted to receive a threaded locking member 24 pivotally mounted upon an arm 25 rigid with the back. A lock nut 26 is carried by the member 24 and serves to secure the casing and the back together, as is shown most clearly in Fig. 4.

Positioned within the casing, between the parts 19 and 20 thereof, is a lamp socket member 27 having preferably three lamp sockets 28 each of which is directed toward one of the parts of the casing and is adapted to receive a suitable incandescent light 29.

The lamps extend longitudinally of the casing parts and constitute the signals. The casing, at the front, has an inwardly disposed rim 30 by means of which transparent plates 31 and 32 are mounted in position. These plates may consist of glass or other suitable material. The plate 32, which is located in the part 20 of the casing, is preferably red, and with the light, constitutes the "Stop" signal. The back of the casing within the part 20, if so desired, may be provided with a suitable reflecting surface, such as a coat of white paint. The glass 31 is preferably not colored, so that the resulting light is white, when the lamps thereunder are illumined. If so desired, the glass 31 around the edges and over the lamp socket member, may be obscured or clouded, for example, by a coating of black paint 33. I employ partitions 34 at the end of the casing parts 19, to prevent reflected light from entering when the respective lamps therein are not lighted.

A conductor 35, fastened to the lamp socket member by a set-screw 36 or in any other suitable manner, serves to connect the same with a suitable source of electrical supply. Conductors 37 are connected with the respective lamp sockets by means of set-screws 38 or the like and terminating at a switch 39. The switch may be of any suitable form, and preferably has a contact mounting plate 40 of insulating material and a cover 41, of like material, having openings 42 through which push-buttons 43 project. Contacts 44 are mounted within the switch and have the conductors 37 secured thereto by suitable screws 45 or the like. One of the contacts has laterally extended arms 46 over which extend two contact-making members 47 each carrying one of the push-buttons 43. The members 47 are offset and are fashioned from normally resilient material so that they are held out of engagement with the contacts 44. A further contact-making member 48 connected with the members 47 by a transverse strip 49, carries the remaining push-buttons 43, and like the members 47, is offset so that it is held out of engagement with the remaining contact 44. A conductor 50 connects the three members 47 and 48 with the source of electrical supply.

The arrangement of the switch-bar is such that when the member 48 is operated by means of its push-button, to actuate its contact 44, current flows through the lamp 29 in the part 20 of the casing, and this lamp becomes operative to give a signal that the vehicle is about to stop, the other lamps of course, remaining inoperative. The resulting signal is of course, the flashing of a red light. When one or the other of the buttons 43 is pressed, the corresponding member 47 engages not only its contact 44, but an arm 46 as well, so that current flows to the lamp 29 in the part 20 of the casing, and as well, to the lamp in a part 19 of the casing corresponding to the button 43. Thus, if the driver of the vehicle intends to signal that the vehicle is about to turn in one direction or the other the corresponding "Right" or "Left" light is lighted, and at the same time the red "Stop" signal is given, so that the attention of the driver of a following vehicle is almost certainly called thereto.

The switch is of course mounted in any suitable place, preferably adjacent to the driver's seat, and is provided with lugs 51 or other suitable means for securing it in place. The three buttons 43 of the switch are triangularly positioned to correspond to the position of the signal lights, so that the driver will have no difficulty in identifying the proper buttons when he desires to give a certain signal.

Having thus described my invention, I claim as new, and desire to secure by Letters Patent:

1. A casing having horizontal and alined portions and a vertical central portion, the front and back being parallel, the back being hinged and the front having transparent material therein, the transparent material of the vertical portion being a different color from that of the other portions, the casing being provided with vertical partitions at the inner ends of the horizontal portions, an electric light in each portion of the casing, and a switch, whereby the light in the vertical portion of the casing may be lighted alone, or it and either of the other lights lighted.

2. A casing having horizontal and alined portions and a vertical central portion, the front and back being parallel, the back being hinged and the front having transparent material therein, the transparent material of the vertical portion being a different color from that of the other portions, the casing being provided with vertical partitions at the inner ends of the horizontal portions, an electric lamp bracket carried by the hinged back, incandescent lamps carried by the bracket and projecting into the portions of the casing, and means for controlling the lamps.

In testimony whereof I have signed my name to this specification in the presence of two subscribing witnesses.

CHARLES EMSHEIMER.

Witnesses:
JOHN K. BRACHVOGEL,
PHILIP D. ROLLHAUS.